United States Patent
Kim (10) Patent No.: US 12,004,648 B2
(45) Date of Patent: Jun. 11, 2024

(54) WRIST SUPPORT APPARATUS FOR COMPUTER WORK

(71) Applicant: Eun Kyoung Kim, Seoul (KR)

(72) Inventor: Eun Kyoung Kim, Seoul (KR)

( * ) Notice: Subject to any disclaimer, the term of this patent is extended or adjusted under 35 U.S.C. 154(b) by 37 days.

(21) Appl. No.: 17/797,422

(22) PCT Filed: Feb. 3, 2021

(86) PCT No.: PCT/KR2021/001395
§ 371 (c)(1),
(2) Date: Aug. 3, 2022

(87) PCT Pub. No.: WO2021/158006
PCT Pub. Date: Aug. 12, 2021

(65) Prior Publication Data
US 2023/0090445 A1    Mar. 23, 2023

(30) Foreign Application Priority Data

Feb. 5, 2020  (KR) .................. 10-2020-0013418
Feb. 24, 2020 (KR) .................. 10-2020-0021978

(51) Int. Cl.
*A47C 20/02*  (2006.01)
*A47B 97/00*  (2006.01)
*A47C 16/00*  (2006.01)

(52) U.S. Cl.
CPC ............. *A47B 97/00* (2013.01); *A47C 16/00* (2013.01); *A47B 2200/0091* (2013.01); *A47C 20/023* (2013.01)

(58) Field of Classification Search
CPC . A47B 97/00; A47B 2200/0091; A47C 16/00; A47C 20/023; A47C 20/02; A61F 5/3761; B60N 2/787

(Continued)

(56) References Cited

U.S. PATENT DOCUMENTS 1,376,280 A  *  4/1921  James ................... B21J 15/30
                                                    248/118
1,510,877 A  *  10/1924  Wiedenmann ......... B43L 15/00
                                                    248/118.5

(Continued)

FOREIGN PATENT DOCUMENTS

JP       2002-306277 A     10/2002
JP       2004-129838 A      4/2004

(Continued)

OTHER PUBLICATIONS

International Search Report for PCT/KR2021/001395 dated May 3, 2022 from Korean Intellectual Property Office.

(Continued)

*Primary Examiner* — Nkeisha Smith
(74) *Attorney, Agent, or Firm* — Revolution IP, PLLC (57) ABSTRACT

A wrist support apparatus (100) for computer work, includes: a main body (110) which is a frame; and a support member (120), wherein the main body (110) includes a bottom portion (113), and side portions (111) extending upward from both sides of the bottom portion (113) in the width direction and facing each other. The support member (120) includes a support main body (121) made of an extendable material. The support main body (121) extends along the outer surfaces of the bottom portion (113) and the both side portions (111), is spaced apart from the bottom portion (113) in the upward direction so as to extend in the width direction between the both side portions (111), and forms a closed loop.

9 Claims, 6 Drawing Sheets

(58) Field of Classification Search
USPC .................................. 248/118.1, 118, 118.3
See application file for complete search history.

(56) References Cited

U.S. PATENT DOCUMENTS

| | | | | |
|---|---|---|---|---|
| 2,363,058 | A * | 11/1944 | Baldwin | A41D 13/0568 |
| | | | | 2/24 |
| 3,232,289 | A * | 2/1966 | Zimmerman | A61F 5/0585 |
| | | | | D24/190 |
| 4,265,232 | A * | 5/1981 | Stonich | A61F 5/37 |
| | | | | 128/877 |
| 4,862,904 | A * | 9/1989 | West | A61M 25/02 |
| | | | | 128/877 |
| 4,941,480 | A * | 7/1990 | McLean | A61F 5/05841 |
| | | | | 128/878 |
| 4,973,176 | A * | 11/1990 | Dietrich | A47B 21/0371 |
| | | | | 248/118 |
| 5,081,715 | A * | 1/1992 | Mascia | A41D 13/082 |
| | | | | 2/910 |
| 5,193,771 | A * | 3/1993 | Hassel | A61F 5/0118 |
| | | | | 248/205.2 |
| 5,332,288 | A * | 7/1994 | Coates | B60N 2/787 |
| | | | | 296/153 |
| 5,335,888 | A * | 8/1994 | Thomsen | A47B 21/0371 |
| | | | | 248/205.2 |
| 5,547,463 | A * | 8/1996 | Hinchliffe | A61B 90/00 |
| | | | | 600/102 |
| 5,957,874 | A * | 9/1999 | Klein | A61F 5/0195 |
| | | | | 128/882 |
| 6,048,325 | A * | 4/2000 | Kendall | A61F 5/0118 |
| | | | | 602/5 |
| 11,638,656 | B2 * | 5/2023 | Cox | A61F 5/3753 |
| | | | | 602/4 |
| 11,766,960 | B1 * | 9/2023 | Ferguson | A61F 5/3761 |
| | | | | 248/118 |
| 2012/0172775 | A1 | 7/2012 | Nien et al. | |

FOREIGN PATENT DOCUMENTS

| | | |
|---|---|---|
| JP | 2004-185125 A | 7/2004 |
| JP | 3142725 U | 6/2008 |
| KR | 20-0221051 Y1 | 4/2001 |
| KR | 20-0318984 Y1 | 7/2003 |
| KR | 10-2006-0098294 A | 9/2006 |

OTHER PUBLICATIONS

Office Action of Japanese Patent Application No. 2022-547863 dated Nov. 7, 2023.

* cited by examiner

WRIST SUPPORT APPARATUS FOR COMPUTER WORK

TECHNICAL FIELD

The present invention relates to a wrist support apparatus for computer work, and more particularly, to a wrist support apparatus for computer work, which a user wears when using a mouse or a keyboard.

BACKGROUND ART

In general, a user uses a keyboard and a mouse of a computer, which are placed on a desk, in order to input necessary information. While using the keyboard or the mouse, the user feels stiffness in the wrist since the wrist is bent and strained, and so, it causes carpal tunnel syndrome.

In order to solve the above problems, various wrist supports have been disclosed, but they have several disadvantages in that it is difficult to use both a keyboard and a mouse, in that they must be placed long on a desk to simply support the wrist from below, and in that they cannot elastically support the wrist or tighten the wrist too strongly.

DISCLOSURE

Technical Problem

Accordingly, the present invention has been made in view of the above-mentioned problems occurring in the related art, and it is an object of the present invention to provide a wrist support apparatus for computer work, which can be used for both of keyboard work and mouse work, elastically support the wrist, is easy to be attached and detached, and is capable of adjusting height and elasticity.

Technical Solution

To accomplish the above-mentioned objects, according to the present invention, there is provided a wrist support apparatus for computer work, including: a main body which is a frame; and a support member, wherein the main body includes a bottom portion and side portions which extend upwardly from both sides of the width direction of the bottom portion, the support member includes a support body made of an extensible material, and the support member extends along the outer surface of the bottom portion and the both side portions, spaced upwardly from the bottom portion, and extending in the width direction between the side portions to form a closed loop.

Moreover, the support member further includes a support extension portion, which is made of an extensible material, and of which both sides of the width direction are coupled to the support body. The support extension portion is disposed above the support body, and includes a wearing portion formed above the support body so that the user can insert the hand between the support extension portion and the support body to wear the wrist support apparatus.

Furthermore, the support member further includes a first coupling means, and the first coupling means includes a first coupling portion provided on the surface facing the support body at the end portion of the support extension portion, and a second coupling portion detachably coupled to the first coupling portion and provided on the outer surface of the support body outward from the other side portion. The both width-directional sides of the support extension portion are coupled to the support body when the first coupling portion and the second coupling portion are coupled to each other.

Additionally, the support member further includes a closed loop coupling means, and the closed loop coupling means includes: a first closed loop coupling portion provided on the outer surface of one end portion of the support body; and a second closed loop coupling portion spaced apart from the first closed loop coupling portion in the longitudinal direction of the support body to be disposed on the opposite side of the first closed loop coupling portion, and detachably coupled to the first closed loop coupling portion. The support body forms a closed loop when the first closed loop coupling portion and the second closed loop coupling portion are coupled with each other.

In addition, the side portions respectively have mounting holes formed in the lateral direction to be spaced upwardly apart from the bottom portion, the support body passes through the mounting holes of side portions, and the first closed loop coupling portion and the second closed loop coupling portion are coupled to each other to form a closed loop.

Moreover, a plurality of mounting holes are formed in the side portions to be spaced apart from each other in the up-and-down direction.

Furthermore, the support member further includes a first coupling means, and the first coupling means includes a first coupling portion provided on the surface facing the support body at the end portion of the support extension portion, and a second coupling portion detachably coupled to the first coupling portion and provided on the outer surface of the support body outward from the other side portion. Both width-directional sides of the support extension portion are coupled to the support body when the first coupling portion and the second coupling portion are coupled to each other.

Furthermore, the side portions respectively have body extension portions extending upwardly from both upper sides of the back-and-forth direction, and the portion upwardly spaced from the bottom portion of the support body passes between the body extension portions of the side portions.

Additionally, the side portions further respectively include body protrusions which inwardly extend in the back-and-forth direction at end portions of the body extension portions so that the end portions are spaced apart from each other and face each other, and a portion of the support body spaced upwardly from the bottom portion and extending in the width direction between the side portions is located below the body protrusion.

In addition, the wrist support apparatus further includes a cushion member, wherein the cushion member includes a support body portion upwardly spaced apart from the bottom portion and extending between the side portions in the width direction.

Advantageous Effects

The wrist support apparatus (100) for computer work can be used for both of keyboard work and mouse work without taking off and on the wrist support apparatus (100) repeatedly, can elastically and comfortably support the wrist, is capable of adjusting height and elasticity for supporting the wrist, and allows a user to easily take off or wear the wrist support apparatus.

MODE FOR INVENTION

All the technical terms and scientific terms used in the description of the present invention have the meaning generally understood by those of ordinary skill in the art to which this disclosure belongs, unless otherwise defined. All of the terms used in this disclosure are selected for purposes of describing the present disclosure more clearly, and are not intended to limit the scope of the invention in accordance with the present disclosure.

It should be understood that the terms "comprise" "include", "having" and the like used in the description of the present invention should be understood as open-ended terms, including the possibility of including other embodiments, unless otherwise stated in the phrase or sentence in which the corresponding expressions are included.

The terms of a singular form may include plural forms unless otherwise specified, which is likewise applicable to the terms of a singular form set forth in the claims.

The terms such as "first" and "second" used in the description of the present invention are used to distinguish a plurality of components, and do not limit the order or importance of the components.

It will be understood that when a component is referred to as being "coupled" or "connected" to another component, it can be directly coupled or connected to the other component, or a new component may be intervened therebetween.

Hereinafter, a wrist supporting apparatus for computer work according to the present invention will be described in detail with reference to the accompanying drawings.

Figure 1:
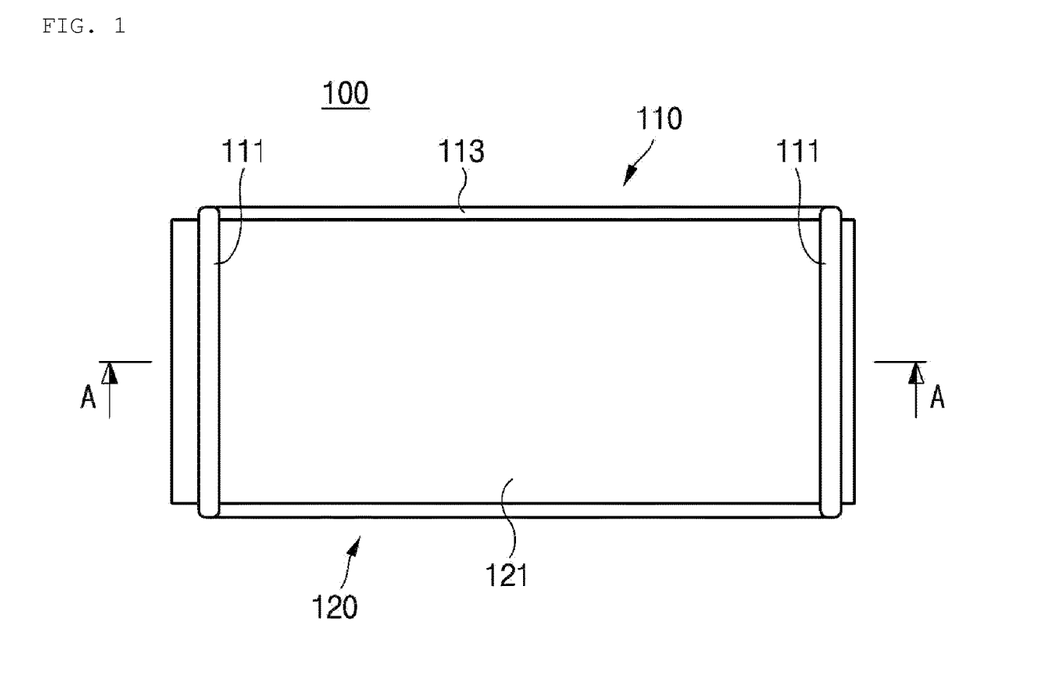
FIG. 1 is a plan view of a wrist support apparatus for computer work according to an embodiment of the present invention.
Figure 2:
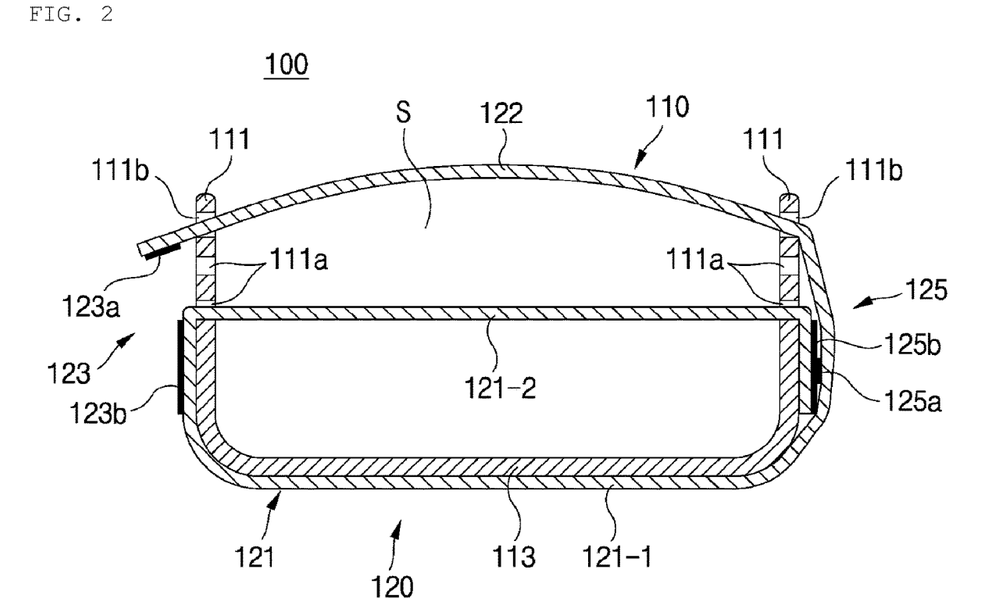
FIG. 2 is a cross-sectional view taken along the line A-A' of FIG. 1.
Figure 3:
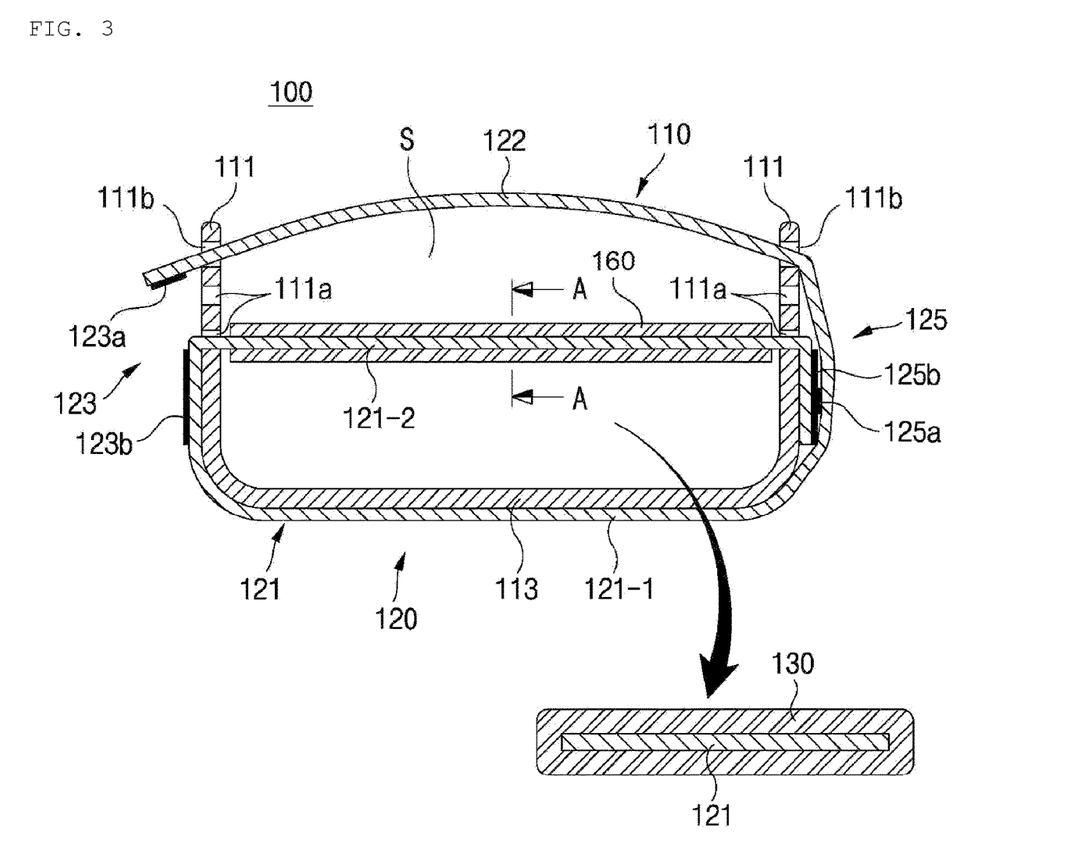
FIG. 3 is a cross-sectional view and a partially cross-sectional view taken along the line A-A' of FIG. 1.
Figure 4:
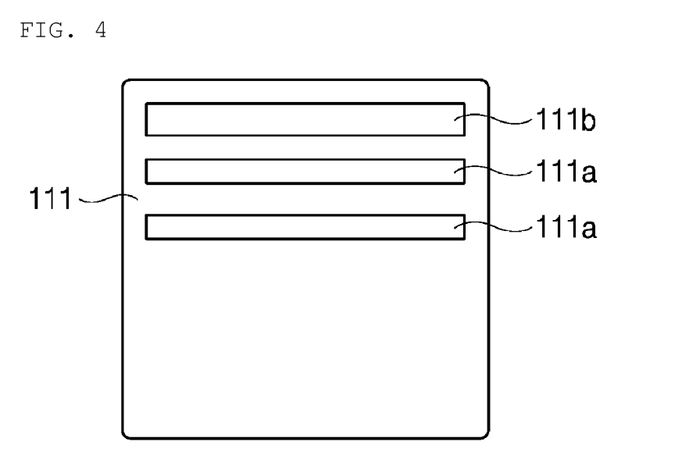
FIG. 4 is a side view of a main body included in the wrist support apparatus for computer work according to the embodiment of the present invention.
Figure 5:
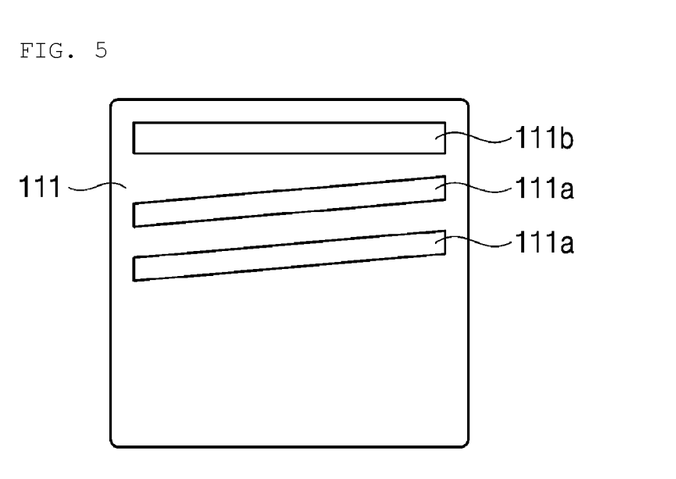
FIG. 5 a side view of a main body included in a wrist support apparatus for computer work according to a modification of the present invention.
Figure 6:
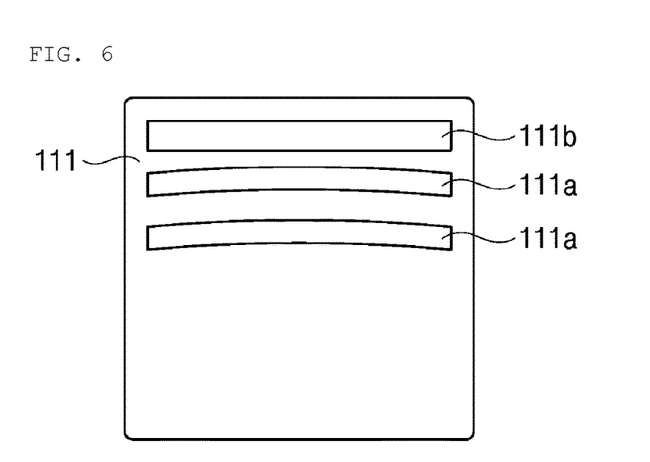
FIG. 6 is a partially side view of a main body included in a wrist support apparatus for computer work according to another embodiment of the present invention.
Figure 7:
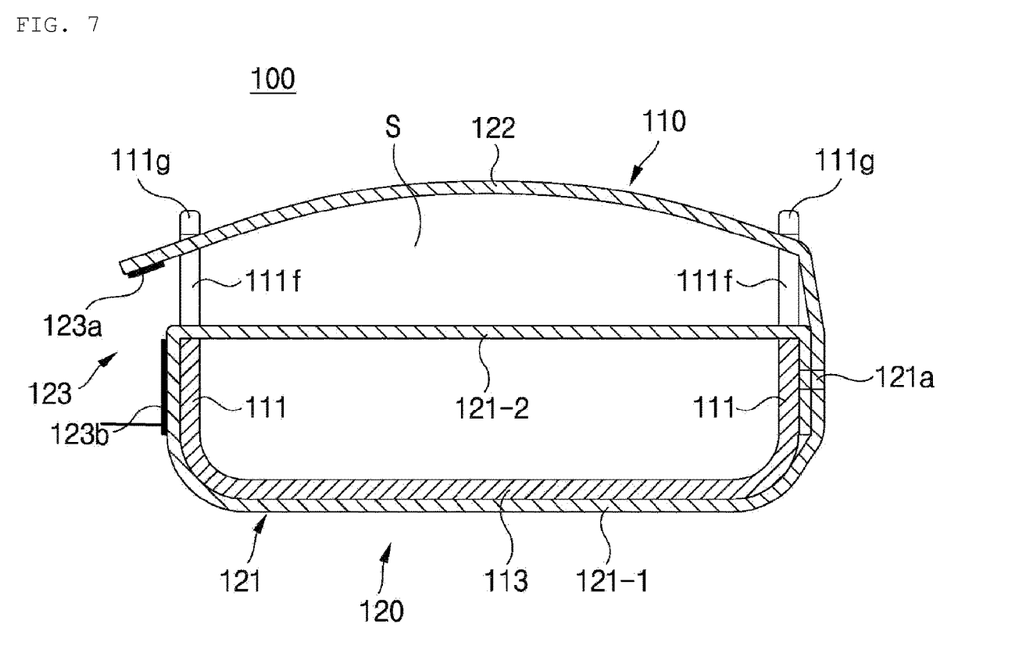
FIG. 7 is a cross-sectional view taken along the line A-A' of FIG. 1, showing a wrist support apparatus for computer work according to a modification of the present invention.
Figure 8:
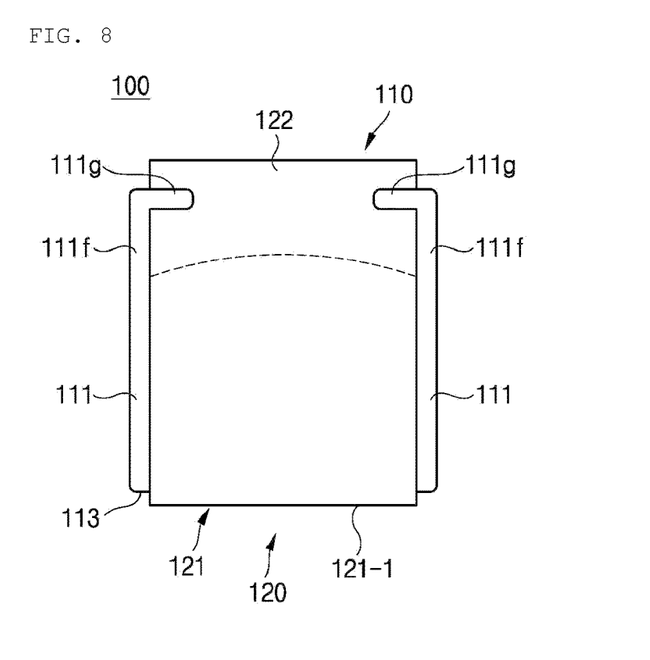
FIG. 8 is a side view of the wrist support apparatus for computer work illustrated in FIG. 7.
Figure 9:
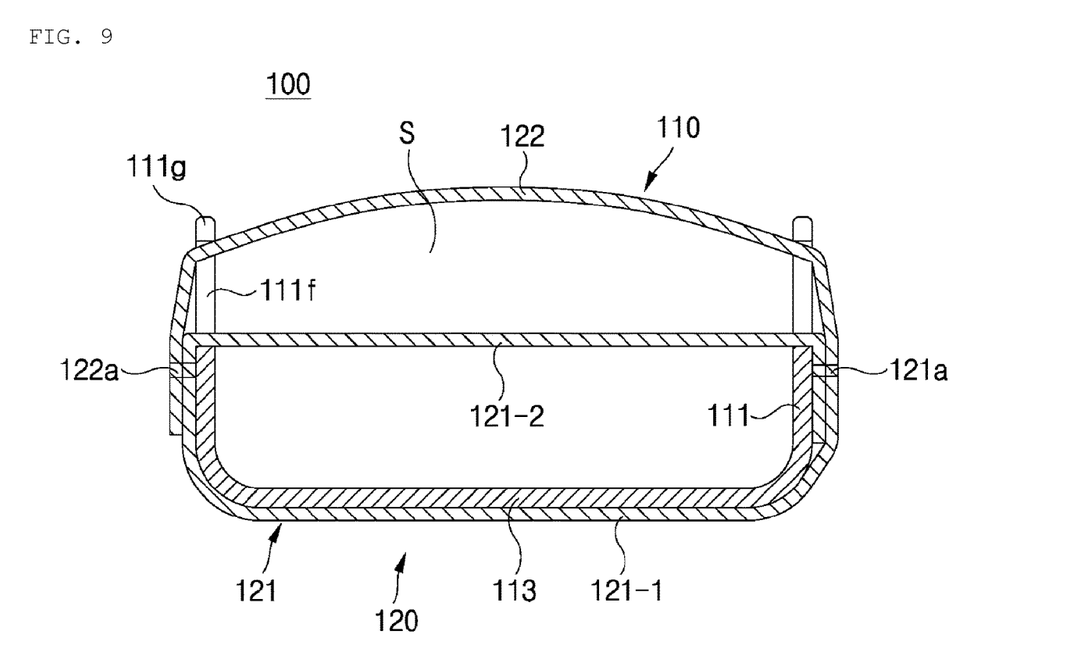
FIG. 9 is a cross-sectional view taken along the line A-A' of FIG. 1, showing a wrist support apparatus for computer work according to another modification of the present invention.
Figure 10:
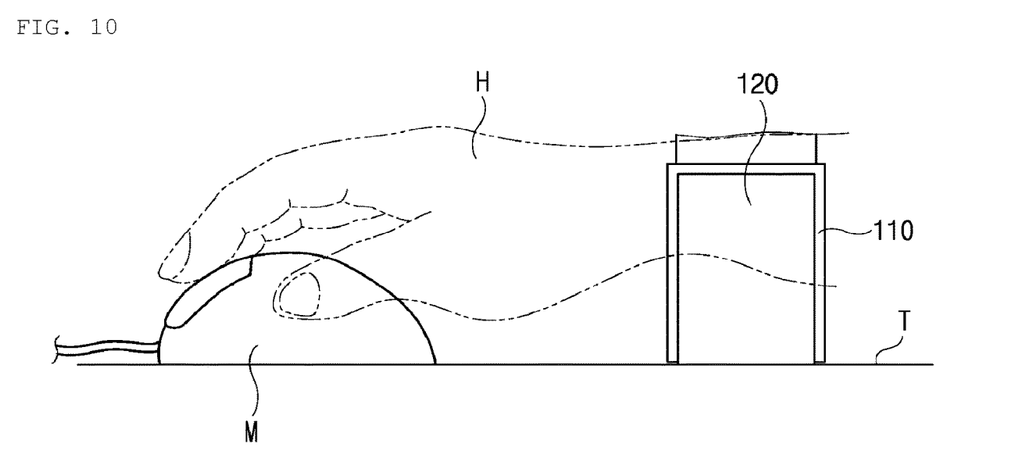
FIG. 10 is a side view illustrating a used state of the wrist supporting apparatus for computer work according to the present invention.

FIG. 1 is a plan view of a wrist support apparatus for computer work according to an embodiment of the present invention, FIG. 2 is a cross-sectional view taken along the line A-A' of FIG. 1, FIG. 3 is a cross-sectional view and a partially cross-sectional view taken along the line A-A' of FIG. 1, FIG. 4 is a side view of a main body included in the wrist support apparatus for computer work according to the embodiment of the present invention, FIG. 5 a side view of a main body included in a wrist support apparatus for computer work according to a modification of the present invention, FIG. 6 is a partially side view of a main body included in a wrist support apparatus for computer work according to another embodiment of the present invention, FIG. 7 is a cross-sectional view taken along the line A-A' of FIG. 1, showing a wrist support apparatus for computer work according to a modification of the present invention, FIG. 8 is a side view of the wrist support apparatus for computer work illustrated in FIG. 7, FIG. 9 is a cross-sectional view taken along the line A-A' of FIG. 1, showing a wrist support apparatus for computer work according to another modification of the present invention, and FIG. 10 is a side view illustrating a used state of the wrist supporting apparatus for computer work according to the present invention.

Hereinafter, in the following description of the present invention, the horizontal direction of FIG. 1 is referred to as the "width direction", and the vertical direction is "back- and forth direction", and the vertical direction of FIG. 2 is referred to as the "up-and-down direction". When a user wears the wrist support apparatus for computer work according to the present invention, the direction toward the elbow is referred to as the rear, and the direction toward the fingertip is referred to as the front.

The wrist support apparatus 100 for computer work according to an embodiment of the present invention includes a main body 110 and a support member 120. The main body 110 acts as a frame for maintaining a shape, and the support member 120 acts as a support for elastically supporting the wrist.

The main body 110 includes a bottom portion 113, and a side portion 111 extending upwardly from both sides in the width direction of the bottom portion 113 and facing each other. The main body 110 may be made of wood, metal such as aluminum, or synthetic resin such as ABS or nylon, and may include one or more of the foregoing. The main body 110 may be made of a metallic material and may be manufactured by bending both sides, or may be injection-molded with synthetic resin. An interval between the side portions 111 is, for example, 8 cm to 12 cm.

The support member 120 supports the wrist. The support member 120 includes a support body 121 made of an extensible material. For example, the support body 121 is a rubber band that a rubber band and fiber are woven together to be extensible.

The support body 121 extends along the outer surface of a bottom portion 113 and the outer surfaces of the side portions 111 of the main body 110, and is spaced upwardly from the bottom portion 113 and extends in the width direction between the side portions 111 to form a closed loop. The wrist is put on a width-directionally extending portion 121-2 between the side portions 111 to elastically support the wrist. The wrist is comfortably supported since being supported by the support body 121 made of the extensible material. Even though the height of the wrist is changed in the up-and-down direction during computer work, the support body 121 is extended in accordance with the height of the wrist, thereby preventing external force or impact on the wrist. According to the user's use, a portion of the hand and a wrist portion may be placed together on the wrist support apparatus to be elastically supported.

The support member 120 further includes a support extension portion 122 formed above the support body 121 and made of an extensible material, and a wearing portion S formed above the support body 121 so that the user can insert the hand between the support extension portion 122 and the support body 121.

The support body 121 is stacked in contact with the outer surface of the bottom portion 113 and is stacked in contact with the outer surfaces of the side portions 111. In the description of the support body 121, the inner surface of the closed loop is referred to as the 'inner surface', and the outer surface of the closed loop is referred to as the 'outer surface'.

Since the main body 110 includes the support body 121 of the closed loop form, the wrist support apparatus according to the present invention does not require additional coupling means to mount the support member 120 on the main body 110. Since the support body 121 is provided along the outer surface (lower surface) 113 of the bottom portion 113, the support body 121 gets in contact with a desk while the wrist support apparatus is used (reference numeral 121-1 in FIGS. 2, 3, and 11). Therefore, the wrist support apparatus according to the present invention can prevent noise from being generated when the bottom portion 113 of the main body 110, which is a frame, directly gets in contact with the desk.

As illustrated in FIG. 2, the support member 120 includes a closed loop coupling means 125 to form a closed loop when being coupled. The closed loop coupling means 125 includes a first closed loop coupling portion 125b provided on the outer surface of one end portion of the support body 121, and a second closed loop coupling portion 125a spaced apart from the first closed loop coupling portion 125b in the longitudinal direction of the support body 121 to be disposed on the opposite side of the first closed loop coupling portion 125b, and detachably coupled to the first closed loop coupling portion 125b. The support body 121 forms a closed loop when the first closed loop coupling portion 125b and the second closed loop coupling portion 125a are coupled with each other. The closed loop coupling means 125 may be Velcro tapes to be detachably coupled with each other. The first closed loop coupling portion 125b is formed to be longer than the second closed loop coupling portion 125a. Tension of the support body 121 can be simply adjusted when the length of the closed loop is adjusted by adjusting a position where the second closed loop coupling portion 125a is coupled to the first closed loop coupling portion 125b, thereby adjusting height to support the wrist.

The support extension portion 122 is integrally formed with the same material as the support body 121. The support extension portion 122 is integrally formed with the support body 121. The support body 121 is formed at a section where the first closed loop coupling portion 125b and the second closed loop coupling portion 125a are disposed, and the support extension portion 122 is formed at a portion extending outward from the second closed loop coupling portion 125a. Hereinafter, the support extension portion 122 is formed at a section between a first coupling portion 123a and the second closed loop coupling portion 125a.

The support member 120 further includes a first coupling means 123. The support extension portion 122 extends from the support body 121 on the outside of one side portion 111, and preferably is longer than the interval between both of the side portions 111. The first coupling means 123 includes a first coupling portion 123a provided on the surface facing the support body 121 at the end portion of the support extension portion 122, and a second coupling portion 123b detachably coupled to the first coupling portion 123a and provided on the outer surface of the support body 121 outward from the other side portion 111. The second coupling portion 123b is disposed between the first closed loop coupling portion 125b and the second closed loop coupling portion 125a.

The first coupling means 123 may be Velcro tapes detachably coupled to each other. Preferably, the second coupling portion 123b is longer than the first coupling portion 123a. The first coupling portion 123a and the second coupling portion 123b are coupled to each other to form another closed loop, which is the wearing portion S so that the user can insert the hand into the upper portion of the support body 121. When a position where the first coupling portion 123a is coupled to the second coupling portion 123b is adjusted, the wrist support apparatus according to the present invention can loosen or tighten the wrist inserted into the closed loop formed above the support body 121. The position where the first coupling portion 123a is coupled to the second coupling portion 123b can be adjusted according to the user's need and feeling.

As illustrated in FIG. 2, the side portions 111 respectively have mounting holes 111a formed in the width direction to be spaced upwardly apart from the bottom portion 113. The support body 121 passes through the mounting holes 111a of side portions 111, and the first closed loop coupling portion 125b and the second closed loop coupling portion 125a are coupled to each other to form a closed loop. The mounting hole 111a may be formed in plural to be vertically spaced apart from each other. When the plurality of mounting holes 111a are formed in the side portions 111, it is possible to adjust the height by selecting one of the mounting holes 111a into which the support body 121 is inserted.

The mounting holes 111a are formed in plural to be vertically spaced apart from each other, and the support body 121 is inserted into the mounting hole 111a located below so as to form the closed loop. The support extension portion 122 is inserted into the mounting hole 111a located above so that the first coupling means 123 can be coupled. The support extension portion 122 passes through the upper ends of the side portions 111 so that the first coupling means 123 can be coupled.

The support body 121 is inserted into the mounting hole 111a located above to form the closed loop, and the support extension portion 122 passes through the upper ends of the side portions 111 so that the first coupling means 123 can be coupled.

The side portion 111 further includes an extension portion insertion hole 1/1b laterally formed at a position spaced upwardly from the mounting hole 111a so that the extension portion 122 can be inserted into the extension portion insertion hole 1/1b. In the drawing, the reference numeral 1/1b denotes the extension portion insertion hole, but also the support body 121 may pass through the extension portion insertion hole 1/1b of the side portion 111 to form the closed loop. The support extension portion 122 may pass through the upper ends of the side portions 111, and the first coupling means 123 can be coupled to the support extension portion 122.

As illustrated in FIG. 4, the mounting hole 111a and the extension hole 1/1b are formed in a long hole shape extending in the back-and-forth direction.

As illustrated in FIG. 5, the mounting holes 111a are formed to be inclined downward to the rear (left side of FIG. 5) so that the mounting holes 111a are low at the rear. Since the mounting holes 111a are inclined such that the rear, which is the elbow, is low, the support body 121 passing through the mounting holes 111a is also low at the rear. since inclination angle of the support body is in the same direction as the inclination angle of the arm, the contact load is more uniformly applied.

As illustrated in FIG. 6, the mounting hole 111a is formed in an upwardly curved shape in which a central portion of the back-and-forth direction is high and both sides are low. The support body 121 forming the closed loop extends more at the protruding central portion rather than both sides of the width direction of the mounting holes 111a. Therefore, it can prevent that both back-and-forth end portions of the support body 121 get in contact with the wrist to concentrate pressing force when the user puts the wrist on the support body 121.

As illustrated in FIGS. 7 and 8, the side portions 111 respectively have body extension portions 1/1f extending upwardly from both upper sides of the back-and-forth direction. The portion upwardly spaced from the bottom portion 113 of the support body 121 passes between the body extension portions 1/1f of the side portions 111. Since both back-and-forth directional sides of the support body 121 are caught to the body extension portions 1/1f, it is prevented that the support member 120 is separated from the main body 110 in the width direction.

The support body 121 may be formed of a closed loop through back-stitch coupling 121a. The support extension portion 122 is a section extending from a portion of back-stitch coupling 121a.

As illustrated in FIG. 7, the support body 121, which is a closed loop, is provided along the outer surface of the side portions 111 and the bottom portion 113 after passing between the body extension portions 111f. Of course, in this case, the closed loop coupling means 125 described above is provided to form a closed loop in a detachable manner.

The side portions 111 further respectively include body protrusions 11g inwardly extending in the back-and-forth direction at end portions of the body extension portions 1/1f so that the end portions are spaced apart from each other and face each other. When the user wears the wrist support apparatus, the support extension portion 122 passes below the body protrusions 111g of both side portions, and the end portion of the support extension portion is coupled to the first coupling means 123 from the outside of one side portion 111. The extension portion 122 passes over the first coupling means 123 and is coupled to the body protrusion 111g.

As illustrated in FIG. 9, an end portion of the support extension portion 122 is also back-stitched 122a to the support body 121 forming the closed loop at the outer surface of the other side portion 111, so that the support extension portion 122 is provided on the upper portion of the support body 121.

As described above, the support extension portion 122 is disposed above the support body 121, and the wearing portion S allowing the user to insert the hand to wear is formed between the support body 121 and the support extension portion 122. Therefore, when the user wears the wrist support apparatus 100 for computer work according to the present invention, the wrist is spaced apart from the floor T (See FIG. 10). In FIG. 10, the reference numeral H denotes a hand, M denotes a mouse.

As illustrated in FIG. 3, the wrist support apparatus 100 for computer work according to the present invention further includes a cushion member 160. The cushion member 160 is made of a cushiony material, such as sponge. The cushion member 160 includes a support body portion 121-2 upwardly spaced apart from the bottom portion 113 and extending between the side portions 111 in the width direction. The cushion member 160 serves as a buffer.

INDUSTRIAL APPLICABILITY

The wrist support apparatus 100 for computer work according to the present invention can comfortably support the wrist and improve work efficiency since moving together with the wrist.

The invention claimed is:

1. A wrist support apparatus for computer work comprising:
   a main body (110) which is a frame; and
   a support member (120),
   wherein the main body (110) includes a bottom portion (113) and side portions (111) which extend upwardly from both sides of the width direction of the bottom portion (113),
   wherein the support member (120) includes a support body (121) made of an extensible material,
   wherein the support member (120) extends along an outer surface of the bottom portion (113) and the both side portions (111), spaced upwardly from the bottom portion (110), and extending in the width direction between the side portions (111) to form a closed loop,
   wherein the support member (120) further includes a support extension portion (122), which is made of an extensible material, and of which both sides of the width direction are coupled to the support body (121), and
   wherein the support extension portion (122) is disposed above the support body (121), and includes a wearing portion (S) formed above the support body (121) so that the user can insert the hand between the support extension portion (122) and the support body (121) to wear the wrist support apparatus.

2. The wrist support apparatus according to claim 1, wherein the support member (120) further includes a first coupling means (123), and the first coupling means (123) includes a first coupling portion (123a) provided on a surface facing the support body (121) at the end portion of the support extension portion (122), and a second coupling portion (123b) detachably coupled to the first coupling portion (123a) and provided on an outer surface of the support body (121) outward from one of the side portions (111), and
   wherein both width-directional sides of the support extension portion (122) are coupled to the support body (121) when the first coupling portion (123a) and the second coupling portion (123b) are coupled to each other.

3. The wrist support apparatus according to claim 1, wherein the support member (120) further includes a closed loop coupling means (125), and the closed loop coupling means (125) includes: a first closed loop coupling portion (125b) provided on an outer surface of one end portion of the support body (121); and a second closed loop coupling portion (125a) spaced apart from the first closed loop coupling portion (125b) in the longitudinal direction of the support body (121) to be disposed on the opposite side of the first closed loop coupling portion (125b), and detachably coupled to the first closed loop coupling portion (125b), and
   wherein the support body (121) forms a closed loop when the first closed loop coupling portion (125b) and the second closed loop coupling portion (125a) are coupled with each other.

4. The wrist support apparatus according to claim 3, wherein the side portions (111) respectively have mounting holes (111a) formed in the lateral direction to be spaced upwardly apart from the bottom portion (113), the support body (121) passes through the mounting holes (111a) of side portions (111), and the first closed loop coupling portion (125b) and the second closed loop coupling portion (125a) are coupled to each other to form a closed loop.

5. The wrist support apparatus according to claim 4, wherein a plurality of mounting holes (111a) are formed in the side portions (111) to be spaced apart from each other in the up-and-down direction.

6. The wrist support apparatus according to claim 3, wherein the support member (120) further includes a first coupling means (123), and the first coupling means (123) includes a first coupling portion (123a) provided on a surface facing the support body (121) at the end portion of the support extension portion (122), and a second coupling portion (123b) detachably coupled to the first coupling portion (123a) and provided on an outer surface of the support body (121) outward from one of the side portion (111), and wherein both width-directional sides of the support extension portion (122) are coupled to the support body (121) when the first coupling portion (123a) and the second coupling portion (123b) are coupled to each other.

7. The wrist support apparatus according to claim 1, wherein the side portions (111) respectively have body extension portions (111f) extending upwardly from both upper sides, and a portion upwardly spaced from the bottom portion (113) of the support body (121) passes between the body extension portions (111f) of the side portions (111).

8. The wrist support apparatus according to claim 7, wherein the side portions (111) further respectively include body protrusions (111g) which inwardly extend in a back-and-forth direction at end portions of the body extension portions (111f) so that the end portions are spaced apart from each other and face each other, and a portion of the support body (121) spaced upwardly from the bottom portion (113) and extending in the width direction between the side portions (111) is located below the body protrusions (111g).

9. The wrist support apparatus according to claim 1, further comprising a cushion member, wherein the cushion member (160) includes a support body portion (121-2) upwardly spaced apart from the bottom portion (113) and extending between the side portions (111) in the width direction.

\* \* \* \* \*